United States Patent
Paul

(10) Patent No.: US 11,736,547 B1
(45) Date of Patent: Aug. 22, 2023

(54) SOCIAL MEDIA MUSIC STREAMING

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/681,614

(22) Filed: Feb. 25, 2022

Related U.S. Application Data

(63) Continuation of application No. 17/114,538, filed on Dec. 8, 2020, now Pat. No. 11,316,911, which is a continuation of application No. 16/555,690, filed on Aug. 29, 2019, now Pat. No. 10,911,504.

(51) Int. Cl.
*H04L 65/612* (2022.01)
*G06F 16/638* (2019.01)
*G06F 16/632* (2019.01)
*G06F 16/635* (2019.01)
*G06F 16/68* (2019.01)

(52) U.S. Cl.
CPC .......... *H04L 65/612* (2022.05); *G06F 16/632* (2019.01); *G06F 16/636* (2019.01); *G06F 16/639* (2019.01); *G06F 16/686* (2019.01)

(58) Field of Classification Search
CPC ... H04L 65/612; G06F 16/632; G06F 16/636; G06F 16/639; G06F 16/686
See application file for complete search history.

(56) References Cited

U.S. PATENT DOCUMENTS

| | | |
|---|---|---|
| D392,267 S | 3/1998 | Mason et al. |
| D472,902 S | 4/2003 | Nashida et al. |
| D559,258 S | 1/2008 | Kita et al. |
| D588,151 S | 3/2009 | Okada |
| D606,080 S | 12/2009 | Murchie et al. |
| D616,463 S | 5/2010 | Barcheck et al. |
| D658,203 S | 4/2012 | Hally et al. |
| 8,572,169 B2 | 10/2013 | Partovi et al. |
| D696,269 S | 12/2013 | Hyunjung et al. |
| D713,851 S | 9/2014 | Wood |
| D715,314 S | 10/2014 | Wood |
| D716,822 S | 11/2014 | Wood |
| D723,044 S | 2/2015 | Park |

(Continued)

FOREIGN PATENT DOCUMENTS

| | | | | |
|---|---|---|---|---|
| JP | 2019106201 A | * | 6/2019 | ............. H04L 51/04 |
| KR | 2018022113 A | * | 3/2018 | ............... G06F 9/44 |

OTHER PUBLICATIONS

Cao B., et al., "Systems and Methods for Feature-Based Music Selection," U.S. Appl. No. 16/574,379, filed Sep. 18, 2019, 46 pages.

(Continued)

*Primary Examiner* — Cheikh T Ndiaye
(74) *Attorney, Agent, or Firm* — Greenberg Traurig, LLP

(57) ABSTRACT

Systems and methods for social media music streaming may include (1) providing a music service within a social media platform, (2) detecting a group chat between two or more members of the social media platform, and (3) creating, via the music service, a shared music station for the members of the group chat. Various other methods, systems, and computer-readable media are also disclosed.

20 Claims, 14 Drawing Sheets

(56) References Cited

U.S. PATENT DOCUMENTS

| | | | |
|---|---|---|---|
| 8,971,623 B2 | 3/2015 | Gatt et al. | |
| D738,889 S | 9/2015 | Balles et al. | |
| 9,171,095 B1 | 10/2015 | Bilinski et al. | |
| D759,680 S | 6/2016 | Behar | |
| D760,267 S | 6/2016 | Butcher et al. | |
| D760,759 S | 7/2016 | Butcher et al. | |
| D761,268 S | 7/2016 | Oh et al. | |
| D763,904 S | 8/2016 | Knapp et al. | |
| D767,622 S | 9/2016 | Lee et al. | |
| D770,495 S | 11/2016 | Knapp | |
| D770,499 S | 11/2016 | Rodriguez | |
| D770,500 S | 11/2016 | Rodriguez | |
| D773,526 S | 12/2016 | Butcher et al. | |
| D773,527 S | 12/2016 | Butcher et al. | |
| D773,534 S | 12/2016 | Yuk et al. | |
| D774,053 S | 12/2016 | Kim et al. | |
| D792,445 S | 7/2017 | Sun | |
| D792,453 S | 7/2017 | Butcher et al. | |
| D794,663 S | 8/2017 | Sakuma | |
| D803,239 S | 11/2017 | Yuk et al. | |
| D814,515 S | 4/2018 | Guzman et al. | |
| D819,683 S | 6/2018 | Zhang et al. | |
| D829,759 S | 10/2018 | Clapper et al. | |
| D831,062 S | 10/2018 | Chen | |
| D831,066 S | 10/2018 | Takita et al. | |
| 10,175,757 B2 | 1/2019 | Missig et al. | |
| 10,270,983 B1 | 4/2019 | Van Os et al. | |
| D851,111 S | 6/2019 | Dye et al. | |
| D852,210 S | 6/2019 | Wei | |
| 10,321,193 B2 * | 6/2019 | Tang | H04N 21/41407 |
| D853,410 S | 7/2019 | Barnett et al. | |
| 10,490,026 B2 | 11/2019 | Bryant et al. | |
| D868,811 S | 12/2019 | Jeon et al. | |
| 10,496,705 B1 | 12/2019 | Irani et al. | |
| D874,497 S | 2/2020 | Krenkler et al. | |
| D874,498 S | 2/2020 | Krenkler et al. | |
| D874,499 S | 2/2020 | Krenkler et al. | |
| D874,500 S | 2/2020 | Krenkler et al. | |
| D877,193 S | 3/2020 | Li et al. | |
| 10,623,621 B2 | 4/2020 | Li et al. | |
| D889,478 S | 7/2020 | Rotgans et al. | |
| D890,188 S | 7/2020 | Anno et al. | |
| D892,855 S | 8/2020 | Liu | |
| D895,649 S | 9/2020 | Jetly et al. | |
| 10,783,320 B2 | 9/2020 | Jon et al. | |
| 10,803,160 B2 | 10/2020 | Tussy | |
| D900,845 S | 11/2020 | Tomori | |
| D902,242 S | 11/2020 | Assaf et al. | |
| 10,911,504 B1 | 2/2021 | Paul | |
| 10,963,973 B2 * | 3/2021 | Schneider | G06Q 30/00 |
| 2005/0038819 A1 | 2/2005 | Hicken et al. | |
| 2008/0122796 A1 | 5/2008 | Jobs et al. | |
| 2009/0182736 A1 | 7/2009 | Ghatak | |
| 2009/0262087 A1 | 10/2009 | Kim | |
| 2009/0319356 A1 | 12/2009 | Spitzer et al. | |
| 2010/0049702 A1 | 2/2010 | Martinez et al. | |
| 2010/0192105 A1 | 7/2010 | Kim et al. | |
| 2011/0267530 A1 | 11/2011 | Chun | |
| 2012/0054666 A1 | 3/2012 | Baird-Smith et al. | |
| 2012/0303711 A1 | 11/2012 | Park | |
| 2012/0323938 A1 | 12/2012 | Skeen et al. | |
| 2013/0073983 A1 | 3/2013 | Rasmussen et al. | |
| 2013/0182138 A1 | 7/2013 | Cho | |
| 2013/0198268 A1 | 8/2013 | Hyman | |
| 2013/0218721 A1 | 8/2013 | Borhan et al. | |
| 2013/0339452 A1 | 12/2013 | Shaikh et al. | |
| 2014/0031961 A1 | 1/2014 | Wansley et al. | |
| 2015/0046569 A1 | 2/2015 | Lau et al. | |
| 2015/0127748 A1 | 5/2015 | Buryak | |
| 2015/0148106 A1 | 5/2015 | Choi et al. | |
| 2015/0186454 A1 | 7/2015 | Kim | |
| 2015/0264169 A1 | 9/2015 | Yim et al. | |
| 2016/0034970 A1 | 2/2016 | Musil et al. | |
| 2016/0205340 A1 | 7/2016 | Jang et al. | |
| 2016/0226804 A1 | 8/2016 | Hampson et al. | |
| 2016/0292269 A1 | 10/2016 | O'Driscoll et al. | |
| 2017/0068910 A1 | 3/2017 | Burroughs | |
| 2017/0097993 A1 * | 4/2017 | Reznor | H04M 1/72403 |
| 2017/0109642 A1 | 4/2017 | Kawale et al. | |
| 2017/0289202 A1 * | 10/2017 | Krasadakis | H04L 67/06 |
| 2018/0189391 A1 | 7/2018 | Ip et al. | |
| 2018/0224990 A1 | 8/2018 | Shim et al. | |
| 2019/0050128 A1 | 2/2019 | Lee | |
| 2019/0080066 A1 | 3/2019 | Van Os et al. | |
| 2019/0215449 A1 | 7/2019 | Chun et al. | |
| 2019/0238646 A1 | 8/2019 | Edwards et al. | |
| 2020/0004495 A1 | 1/2020 | Dundar et al. | |
| 2020/0042554 A1 | 2/2020 | Liu et al. | |
| 2020/0089724 A1 | 3/2020 | Zimovnov et al. | |
| 2020/0117340 A1 | 4/2020 | Amitay et al. | |
| 2020/0241746 A1 | 7/2020 | Chen et al. | |
| 2020/0267267 A1 | 8/2020 | Kim et al. | |
| 2021/0089574 A1 | 3/2021 | Paul | |

OTHER PUBLICATIONS

"Daily Mix," Spotify [Online], Oct. 21, 2019 [Retrieved on Oct. 21, 2019], 3 pages, Retrieved from the Internet: URL https://support.spotify.com/us/using_spotify/discover_music/daily-mix/.

Final Office Action dated Jul. 15, 2021 for U.S. Appl. No. 16/574,376, filed Sep. 18, 2019, 43 Pages.

Final Office Action dated Feb. 24, 2021 for U.S. Appl. No. 16/595,267, filed Oct. 7, 2019, 54 Pages.

First Action Interview Office Action dated Sep. 2, 2020 for U.S. Appl. No. 16/595,267, filed Oct. 7, 2019, 36 pages.

First Action Interview Office Action Summary dated Feb. 4, 2021 for U.S. Appl. No. 16/574,376, filed Sep. 18, 2019, 27 pages.

First Office Action Interview dated Jun. 24, 2021 for U.S. Appl. No. 16/555,676, filed Aug. 29, 2019, 32 pages.

Hardwick T., "How to Sign Up for Apple Music," macrumors.com [Online], Feb. 13, 2019 [Retrieved on Jan. 16, 2021], 4 pages, Retrieved from the Internet: URL: https://www.macrumors.com/how-to/sign-up-for-apple-music/.

Non-Final Office Action dated Jul. 9, 2020 for U.S. Appl. No. 16/555,690, filed Aug. 29, 2019, 20 Pages.

Non-Final Office Action dated Jan. 25, 2021 for U.S. Appl. No. 29/706,940, filed Sep. 25, 2019, 23 Pages.

Non-Final Office Action dated Jan. 25, 2021 for U.S. Appl. No. 29/706,941, filed Sep. 25, 2019, 23 Pages.

Notice of Allowance dated Oct. 5, 2020 for U.S. Appl. No. 16/555,690, filed Aug. 29, 2019, 20 Pages.

Paul D., et al., "Transient Contextual Music Streaming," U.S. Appl. No. 16/555,676, filed Aug. 29, 2019, 54 pages.

Paul D., "System and Methods for Digitally Fetching Music Content," U.S. Appl. No. 16/581,812, filed Sep. 25, 2019, 44 Pages.

Paul D., "System and Methods for Digitally Proximity-Based Music Stations," U.S. Appl. No. 16/657,008, filed Oct. 18, 2019, 55 Pages.

Preinterview First Office Action dated Jul. 1, 2020 for U.S. Appl. No. 16/595,267, filed Oct. 7, 2019, 35 pages.

Preinterview First Office Action dated Sep. 4, 2020 for U.S. Appl. No. 16/574,376, filed Sep. 18, 2019, 22 pages.

Preinterview First Office Action dated May 5, 2021 for U.S. Appl. No. 16/555,676, filed Aug. 29, 2019, 49 Pages.

"QR Code Scanning Icon Stock Illustration," istockphoto.com [Online], Jun. 26, 2019 [Retrieved on Jan. 16, 2021], 3 pages, Retrieved from the Internet: URL: https://www.istockphoto.com/vector/qr-code-scanning-icon-gm1158288755-316352859.

Zhang Y., et al., "Siamese Style Convolution Neural Networks for Sound Search by Vocal Imitation," IEEE/ACM Transactions on Audio, Speech, and Language Processing, Sep. 3, 2018, vol. 27 (2), pp. 1-13.

* cited by examiner

SOCIAL MEDIA MUSIC STREAMING

CROSS REFERENCE TO RELATED APPLICATION

This application claims priority to U.S. patent application Ser. No. 17/114,538, entitled "SOCIAL MEDIA MUSIC STREAMING," filed 8 Dec. 2020, which claims priority to U.S. patent application Ser. No. 16/555,690, entitled "SOCIAL MEDIA MUSIC STREAMING," filed 9 Jul. 29 Aug. 2019, the disclosure of which are incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
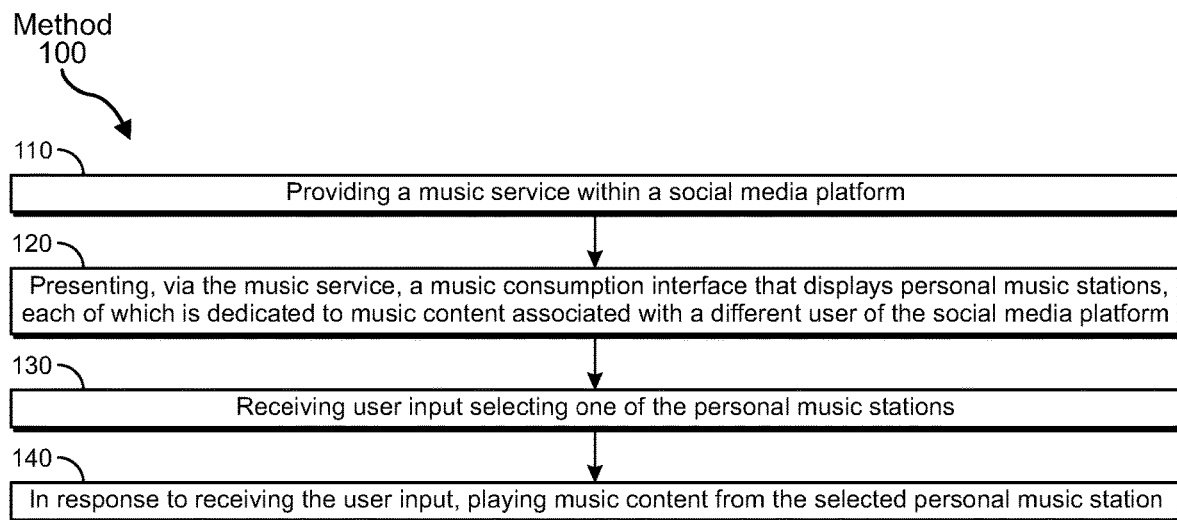
FIG. 1 is a flow diagram of an exemplary method for providing social media music streaming.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

People all over the world feel a need for music. Some music consumption is a personal experience. However, music is also viewed by many as a meaningful social experience. In light of this, the present disclosure identifies a need for improved systems and methods for providing a computer-implemented music service that improves the social connection experienced through music.

As will be described in greater detail below, embodiments of the present disclosure may provide systems and methods for providing a computer-implemented music service within a social media platform. In some examples, the music service may be provided as an active layer within the social media platform. For example, the social media platform may provide a digital media player (e.g., a music player) that may be used to play compositions (e.g., to play compositions that have been organized by the social media platform into music stations for its users). Additionally or alternatively, the music service may be provided as a passive layer within the various services offered by the social media platform (e.g., a digital newsfeed service, a digital stories service, a messenger service, etc.). The music service may enable its users to easily share their music listening activities using a selectable broadcast push button.

In some examples, the music service may create a personal music station (that is, a user-specific music station) for a user of the music service and/or of the social media platform. The personal music station may represent a public-facing music station dedicated to a particular user and may include music listened to by the user and/or music predicted to be enjoyed by the user based on the music listened to by the user. In some examples, a personal music station may include a persistent queue of music compositions. Meaning, the personal music station may include, within its queue of music compositions, music compositions corresponding to past music consumption, as opposed to only including music currently being listened to by a user. Thus, the personal music station may enable asynchronous sharing of music listening behavior.

In some examples, a personal music station may only include music content corresponding to listening behavior identified while a broadcast push button is selected (e.g., within a player interface). In these examples, the broadcast push button may provide an easy sharing mechanism for a user, which enables the user to passively share the user's music listening activities with others.

In some examples, a user of the music service may be presented with a digest of other users' personal music stations. For example, a user may be presented with a music station interface that includes the personal music stations of one or more of the user's contacts. In these examples, each personal music station within the music station interface may be selectable. When selected, the music service may play music corresponding to the selected personal music station. This may enable users to discover music from others' listening activities.

In some embodiments, the music service may enable users to start conversations relating to their music listening activities and/or to organize group playlists (e.g., using a messenger service). In certain embodiments, the music service may create music stations that promote a specific social connection. For example, the music service may create, for a user, a playlist consisting of music that has been listened to by both the user and one of the user's contacts. As another example, the music service may create, for a user, a playlist of music that is most popular with the user's contacts. In some examples, the music service may provide information relating to the cultural relevance of music being played (e.g., related videos, cover albums, articles, comments posted by other users, etc.). In one embodiment, the music service may provide users with a weekly music summary. The weekly music summary may include a variety of information (e.g., most played songs of the week, new music of the week, etc.). In one embodiment, the music service may automatically create yearly music awards based on listening data aggregated from its users.

As will be explained in greater detail below, embodiments of the present disclosure may improve systems for providing music that digitally promotes social connection. The present disclosure may improve the functioning of a computer itself by improving music data organization within devices.

The following will provide, with reference to FIG. 1, detailed descriptions of computer-implemented methods for creating and maintaining personal music stations within a social media platform. Detailed descriptions of corresponding example systems will also be provided in connection with FIG. 2. Detailed descriptions of interfaces related to a corresponding music service will be provided in connection with FIGS. 3-12.

FIG. 1 is a flow diagram of an exemplary computer-implemented method 100 for creating and/or maintaining personal music stations within a social media platform. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that may perform one or more functions directed at providing music to users of a music service 206. In some examples, server 202 may perform music functions in conjunction with a social media platform 208 that provides music service 206 to its users. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc. In some examples, a user 210 of user device 204 may also be a user of music service 206.

In examples in which music service 206 is provided by social media platform 208, user 210 may be a member of social media platform 208 and user device 204 may have installed an instance of a social media application 212 that operates as part of social media platform 208. Additionally or alternatively, user device 204 may have installed a browser that may navigate to one or more webpages maintained by social media platform 208. In these examples, music service 206 may operate as part of social media application 212 and/or one or more webpages maintained by social media platform 208.

Social media platform 208 may provide a variety of services (e.g., in addition to music service 206) for the users within its network. In one example, social media platform 208 may provide a newsfeed service. The term "newsfeed" may generally refer to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, a music composition (as will be described in greater detail below), media-based compositions (which may include either a single media item or a collage of multiple media items), and/or a link to an online article.

As another example, social media platform 208 may provide a digital story service. The digital story service may provide users with a story consumption channel, which presents a continuous series of digital story compositions to a story-consumer, one by one. In one example, the story consumption channel may transition from presenting one digital story composition to the next automatically, without requiring any user input to do so. In some examples, a digital story composition may only be viewable for a predetermined amount of time. For example, a digital story composition may be set to disappear after twenty-four hours. The term "digital story composition" may generally refer to any type or form of social media composition intended for a story consumption channel. A digital story composition may include a variety of content (e.g., a digital photograph, a graphic, text, a digital video and/or a digital recording of a music composition). In some examples, digital story compositions from a same source (e.g., created and posted by a same user) may be grouped together within the story consumption channel, such that each digital story composition from a particular source is displayed prior to displaying digital story compositions from another source.

As another example, social media platform 208 may provide a messaging service. The term "messaging service" may generally refer to any type or form of digital message delivery system that enables users of social media platform 208 to exchange messages (e.g., private messages between two or more users). These messages may include a variety of content (e.g., a text, link, live video, voice recordings, music compositions, etc.) and may take a variety of forms (e.g., e-mail, text message, group chat, etc.).

Figure 2:
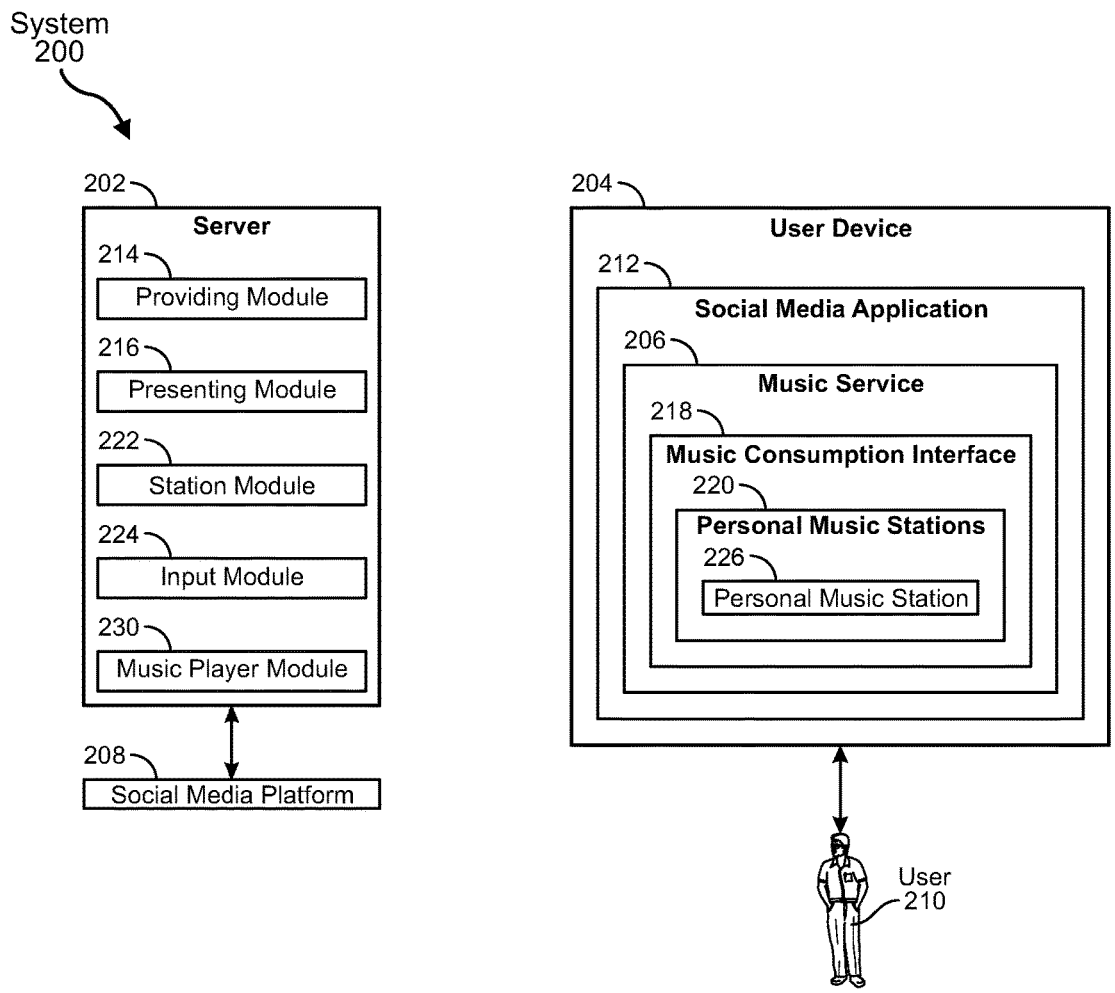
FIG. 2 is a block diagram of an exemplary system for providing social media music streaming.

Returning to FIG. 1, at step 110, one or more of the systems described herein may provide a music service within a social media platform. For example, as illustrated in FIG. 2, a providing module 214 may provide music service 206 (e.g., to user 210 via user device 204) as part of social media platform 208.

The term "music service" may generally refer to any type or form of service that digitally provides music. In some examples, music service 206 may represent a web-based service that streams music to a device that is connected to a network such as the Internet. In one such example, music service 206 may additionally provide music when the device is offline (that is, when the device is disconnected from the network). For example, music service 206 may enable music to be downloaded for a designated amount of time.

Music service 206 may provide music in a variety of ways. In some examples, music service 206 may provide a music player that plays music compositions (i.e., digital recordings of music compositions). In one example, the music player may play music that has been requested directly via user input. For example, the music player may receive a user request for a particular music composition and may play the requested music composition in response to receiving the request. In another example, music service 206 may create a music station for a user (e.g., user 210) and the music player may play music content from the music station.

The term "music station" may refer to any type or form of digital container that stores a queue of music compositions that may be played via a music player provided by music service 206. In some examples, the queue may represent an evolving queue and music compositions may continually be added to the queue in real time (e.g., as the music compositions within the queue are being played). In other examples, the queue may represent a designated set of music compositions (e.g., a playlist). In some examples, the queue may be filled with music compositions that correspond to a particular genre of music or that relate to a common theme. The music compositions may be manually added to a music station via user input, may be automatically added based on deduced user preferences, or a combination.

Music service 206 may deduce a user's preferences in a variety of ways. In one embodiment, a preference-deduction module may deduce the preferences based on the user's listening history with music service 206 (e.g., songs played for the user, posted by the user, and/or designated as liked by the user in the past). In one embodiment, a user's preferences may be based in part on the user's current context.

Music service 206 may provide music in various modes. For example, music service 206 may provide music via an intentional-user mode. In this example, music service 206 may enable users to actively search for music to consume and/or share. In another example, music service 206 may provide music via an ambient mode. In this example, music service 206 may provide a user with music that the user has not specifically searched for (e.g., by providing an automatically generated music station). In an ambient mode, music service 206 may (1) automatically create a music station and (2) automatically provide a push notification with a suggestion to consume the automatically created music station.

In some examples, as discussed above, user 210 may be a member of social media platform 208 and music service 206 may be provided to user 210 as part of social media platform 208 (e.g., via social media application 212). Music service 206 may operate within social media platform 208 in a variety of ways. In one embodiment, music service 206 may operate as a passive layer that operates in the background of another service provided by social media platform 208 and/or as a supplemental feature of another service provided by social media platform 208. For example, music service 206 may operate as a passive layer within a digital story service, a messaging service, and/or a newsfeed service.

As a specific example, a composition interface that enables user 210 to create a social media composition (e.g., a digital story composition and/or a newsfeed composition) may include a selectable element that enables user 210 to add music content to the social media composition. The composition interface may enable the user to create a social media composition that includes music content as the sole and/or primary element of the social media composition or that includes music content as one of several components of the social media composition (e.g., as background music to a digital photograph).

In another example, music service 206 may operate as a passive layer within a messenger service. In this example, a messenger interface that enables user 210 to create private messages may include a selectable element that enables user 210 to share music in the private message, as will be described in greater detail below in connection with step 140.

In addition, or as an alternative, to operating as a passive layer within social media platform 208, music service 206 may operate as part of an active layer within social media platform 208 (e.g., within an active-layer interface or a set of active-layer interfaces dedicated to music consumption and/or music sharing). In some examples, an active-layer interface may correspond to a music player, which may be used to play music content, as will be described in greater detail below. The term "music player" may generally refer to any type or form of application software, provided and/or utilized by music service 206, that is configured to play multimedia files (e.g., audio files) provided via music service 206.

In additional or alternative examples, which will be described in greater detail below in connection with step 120, an active-layer interface may correspond to a music consumption interface that displays a collection of personal music stations. Additionally or alternatively, an active-layer interface may correspond to an informational interface (e.g., a current music events page dedicated to information describing music that is currently trending within social media platform 208's user base).

Figure 3:
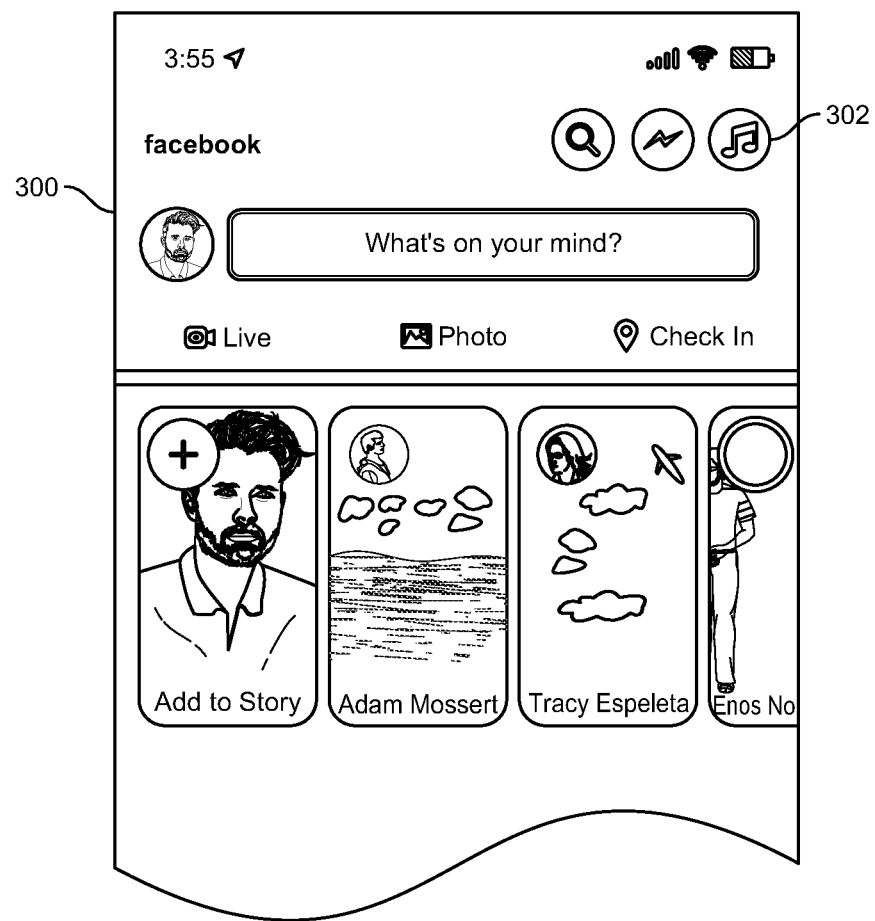
FIG. 3 is an illustration of an exemplary persistent entry point element that navigates to a music service interface.

In embodiments in which music service 206 functions within an active layer of social media platform 208, social media platform 208 may provide a persistent entry point to one or more active-layer interfaces. For example, as illustrated in FIG. 3, an interface 300 may include a persistent entry point 302, which may be permanently affixed to its position within interface 300, that navigates to the active-layer interface. In some examples, a position of persistent entry point 302 may remain the same within a variety of different interfaces provided by social media platform 208.

In some embodiments, as mentioned above, music service 206 may provide a music player, which may be user-operable via a player interface (e.g., an active-layer interface). In these embodiments, the player interface may be presented in a full-screen mode, as illustrated by player interface 400 in FIG. 4A. The player interface in the full-screen mode may include a variety of content. For example, the player interface in full-screen mode may include (1) a list of music compositions that are currently being played, that have been played, and/or are in queue to be played and (2) user controls that enable the user to pause the playing and/or skip forward and/or backward to other music compositions.

Figure 4A:
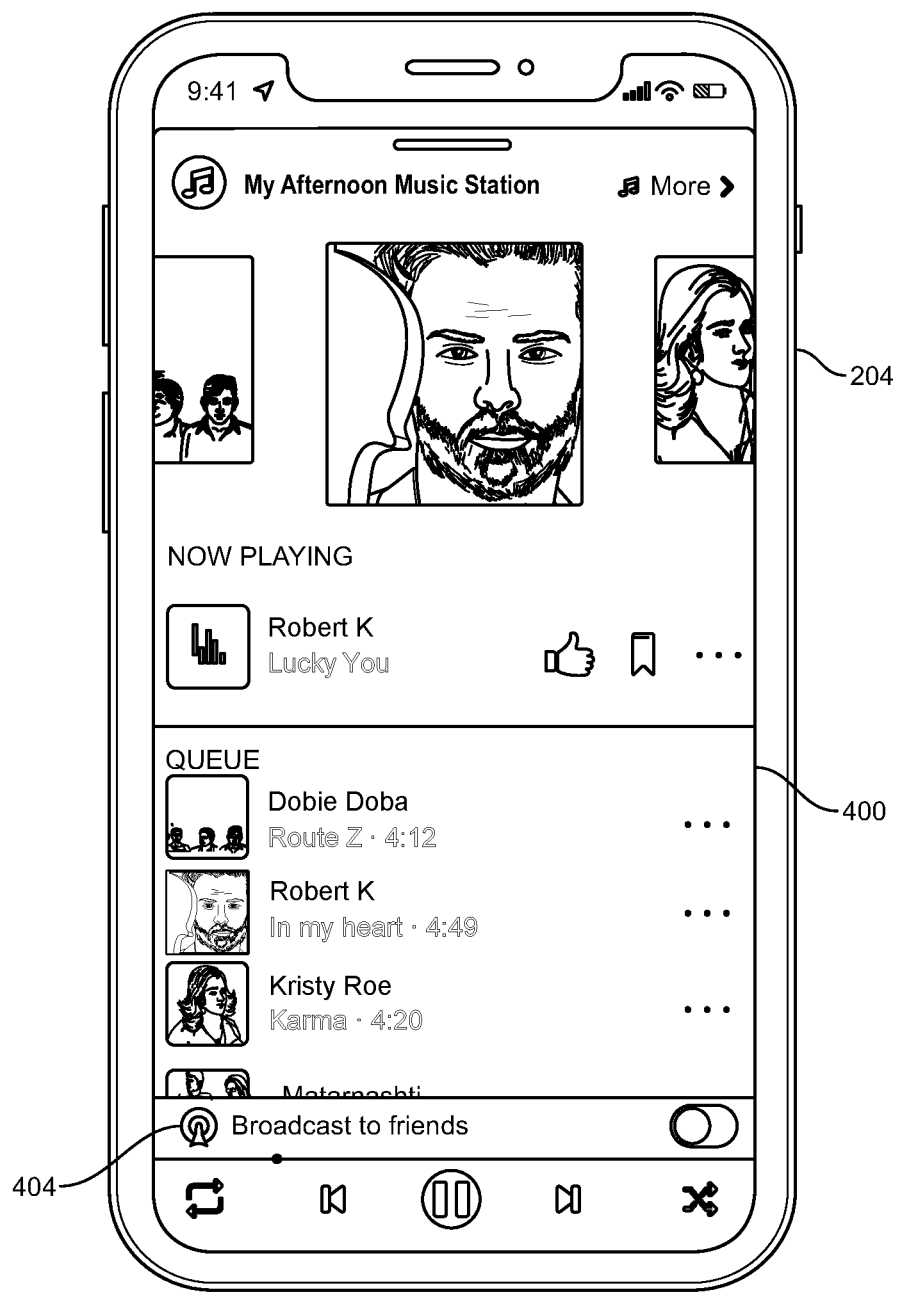
FIG. 4A is an illustration of an exemplary contextual music player with an exemplary broadcast push button.
Figure 4B:
FIG. 4B is an illustration of the exemplary contextual music player depicted in FIG. 4A, which has been minimized and placed in a hover screen over a newsfeed interface.
Figure 4C:
FIG. 4C is an illustration of the exemplary contextual music player depicted in FIGS. 4A and 4B, which has been further minimized.

The player interface may also be minimizable, as shown in FIGS. 4B and 4C, or dismissible. The minimized player interface may provide a minimal amount of information. For example, the minimized player interface may only (1) display a title of a music composition currently playing and/or (2) provide user controls allowing the user to pause the playing and/or skip forward and/or backward to other music compositions. In some examples, the minimized player interface may hover over another interface provided by social media platform 208 (e.g., via social media application 212), such as newsfeed 402 illustrated in FIGS. 4B-4C.

In some examples, the player interface may also include a broadcasting element. FIGS. 4A-4C provide an exemplary depiction of a broadcast push button 404. In these embodiments, a broadcasting module may be configured to broadcast the music content consumed via the player interface while the broadcasting element is selected. In some examples, the broadcasting module may enable a user to select an audience to which the music content will be broadcasted (e.g., a public audience, a contacts-only audience, an audience of select contacts, etc.). The broadcasting module may broadcast the music content consumed while the broadcasting element is selected in a variety of ways. In some examples, the broadcasting module may broadcast the music content to a user profile. Additionally or alternatively, the broadcasting module may broadcast the music content to a social media composition (e.g., a digital story composition and/or a newsfeed composition).

In one embodiment, the broadcasting module may broadcast the music content to a personal music station, as will be described in greater detail below in connection with steps 120-140. In these examples, as will be described in greater detail below, a user of social media platform 208 may be configured with a dedicated music station that includes the music consumed while the user has the broadcasting element selected.

Returning to FIG. 1, at step 120, one or more of the systems described herein may present, via the music service, a music consumption interface that displays a collection of personal music stations, each of which is dedicated to music content associated with a different user of the social media platform. For example, as illustrated in FIG. 2, a presenting module 216 may present a music consumption interface 218 that displays a collection of personal music stations 220, each of which is dedicated to a different user of social media platform 208.

The term "personal music station" may refer to any type or form of music station that is dedicated to music content that reflects the music preferences of a particular user. Each personal music station may be configured as a public-facing station. That is, a user's personal music station may be conceptualized as a means for sharing and/or broadcasting something of the user with others, similar to the way a newsfeed and/or digital story may be conceptualized as a means for sharing and/or broadcasting. In one embodiment, the disclosed systems and methods may also provide a group music station, which functions in the same ways described for personal music stations 220 but that is dedicated to music content that reflects the music preferences of a particular group of users.

In some examples, a station module 222 may automatically create a personal music station for each user that is registered with social media platform 208 (that is, that has an account with social media platform 208). In these examples, station module 222 may maintain each personal music station as long as its corresponding user account is active and may designate each personal music station by the username associated with the corresponding user account.

Station module 222 may create a personal music station in a variety of ways. In one example, station module 222 may monitor, via music service 206, the listening behavior of a user to whom the personal music station is dedicated. For example, station module 222 may monitor music searched for and/or listened to via the user's user account with social media platform 208. Then, station module 222 may select music compositions for the personal music station that correspond to the monitored listening behavior.

Station module 222 may select music compositions that correspond to the monitored listening behavior in a variety of ways. In some examples, station module 222 may (1) identify music compositions that were played for a user, (2) deduce that the music compositions that were played reflect the user's preferences, and (3), in response to the deducing, select the music compositions that were played and/or music compositions that are musically similar to the music compositions that were played. Additionally or alternatively, station module 222 may (1) identify music compositions that the user designated as enjoyable (e.g., by receiving a user selection of a "like" push button while the music composition was playing and/or by receiving a user submission of one or more music compositions that the user indicates reflect the user's preferences) and (2) select the identified music compositions and/or music compositions that are musically similar to the identified music compositions.

Station module 222 may determine that music compositions are musically similar using any type or form of similarity-detection model. In some examples, station module 222 may determine that the music compositions are musically similar based on a usage analysis. For example, station module 222 may determine that music compositions are musically similar based on data collected from playlists of users within a user base. As a specific example, station module 222 may determine that two music compositions are similar because the two music compositions are co-located in a same playlist.

As another example station module 222 may determine that music compositions are musically similar based on a musical quality (e.g., a beat and/or tempo), an artist, and/or a social reaction (e.g., derived from digital comments posted to social media platform 208). In some examples, station module 222 may determine that music compositions are similar using machine learning (e.g., based on an output received from a neural network).

The disclosed systems and methods may provide a variety of vehicles for giving a user control over the privacy of the user's personal music station. For example, a user may select an audience for the user's personal music station via a setting in the user's user account. In some examples, as described above, a music player provided by music service 206 may provide an interface, such as player interface 400 depicted in FIGS. 4A-4C, that displays information relating to a music composition currently being played via the music service for a user. As discussed above, the interface may include a broadcast push button, such as broadcast push button 404 in FIGS. 4A-4C. In these examples, a user may control which music is added to the user's personal music station using the broadcast push button. For example, station module 222 may be configured to select music compositions for a personal music station based only on listening behavior monitored while the broadcast push button is in the on-state.

Figure 5:
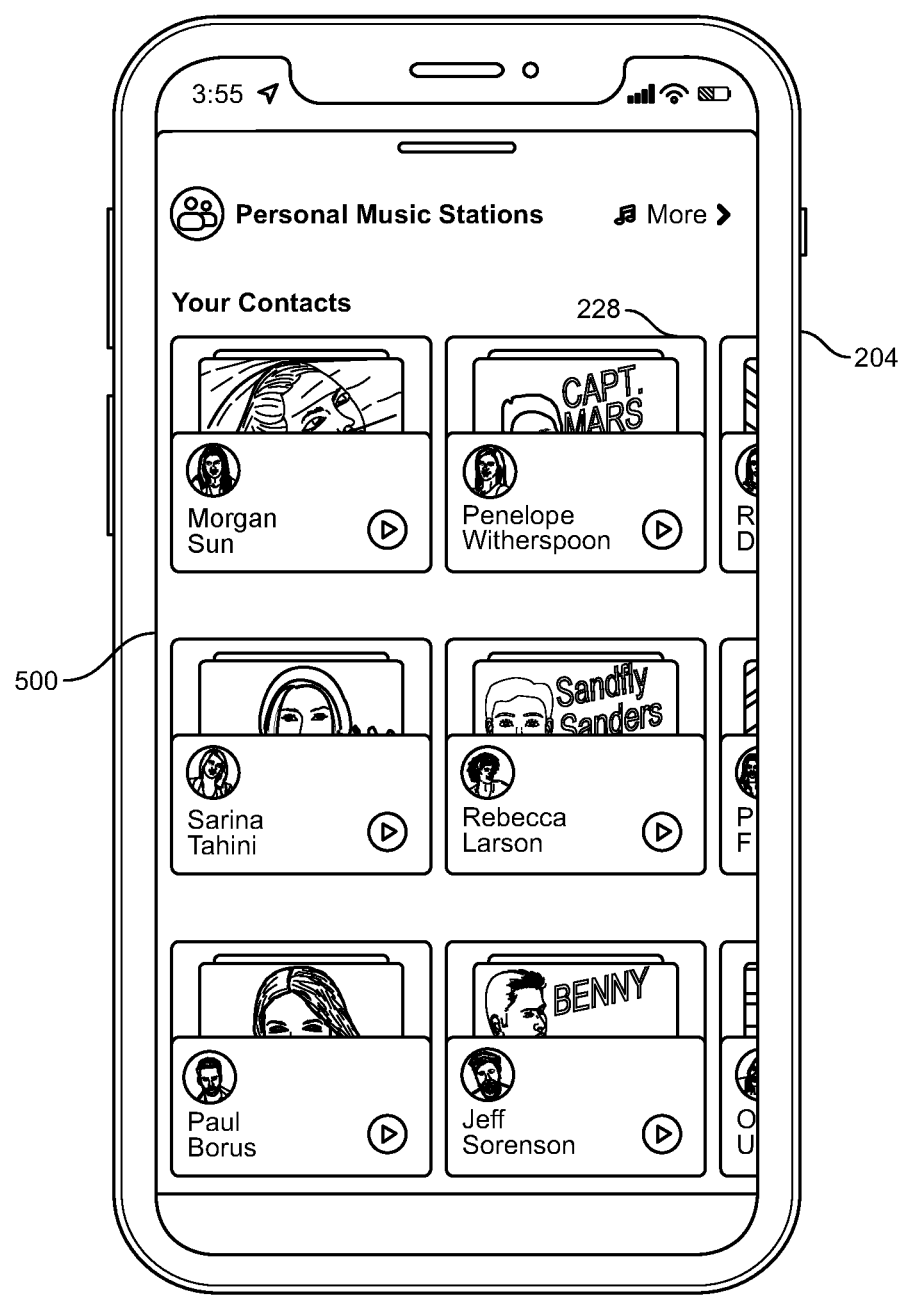
FIG. 5 is an illustration of an exemplary personal music station interface.
Figure 9:
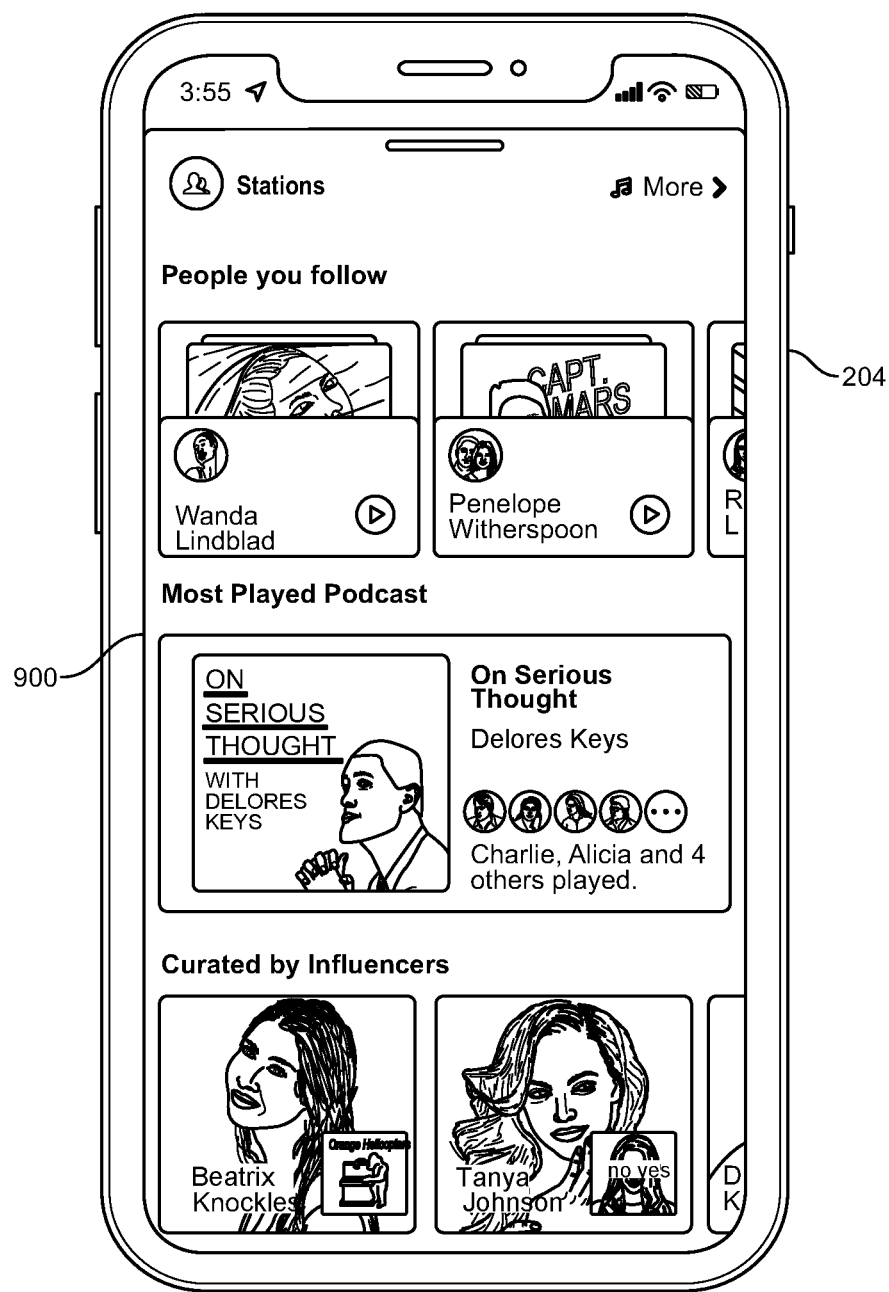
FIG. 9 is an illustration of an exemplary station interface that includes a collection of selectable personal stations.

Music consumption interface 218 may be configured in a variety of ways. In some examples, music consumption interface 218 may be exclusively dedicated to presenting personal music stations. FIG. 5 depicts an exemplary music consumption interface 500 that is dedicated exclusively to presenting personal music stations. In other examples, music consumption interface 218 may be dedicated to providing a variety of different stations, including a set of personal music stations. FIG. 9 depicts an exemplary music consumption interface 900 with this configuration.

Returning to FIG. 2, presenting module 216 may select personal music stations to include within music consumption interface 218 in a variety of ways. For example, presenting module 216 may include the music stations of user 210's contacts, as shown in FIG. 5, of users being followed by user 210, as shown in FIG. 9, and/or of personal music stations that have been designated as open to the public. Presenting module 216 may rely on any type or form of prioritization algorithm to determine an order in which to present personal music stations.

In some embodiments, music consumption interface 218 may include a search element that enables user 210 to browse the personal music stations and/or the content of the personal music stations associated with music consumption interface 218. As a specific example, a search element may enable user 210 to search for personal music stations with certain criteria (e.g., for personal music stations of female contacts and/or for the personal music station of a particular contact) and/or to search for music (e.g., music compositions by a particular artist and/or that relate to a particular theme and/or music type) that is included in the personal music stations of user 210's contacts and/or a specified subset of user 210's contacts.

Returning to FIG. 1, at step 130, one or more of the systems described herein may receive user input selecting one of the personal music stations. For example, an input module 224 may receive user input selecting a personal music station 226 from among personal music stations 220. Turning to FIG. 5 as a specific example, input module 224 may receive user input selecting personal music station 226 corresponding to Penelope Witherspoon. Input module 224 may receive the user input in a variety of ways. In some embodiments, input module 224 may receive the user input via an auxiliary device, such as a keyboard and/or a digital mouse. Additionally or alternatively, input module 224 may receive the user input via a touchscreen.

In response to receiving the user input, one or more of the systems described herein may play music content from the selected personal music station (step 140 in FIG. 1). For example, a music player module 230 may play music content from personal music station 226 in response to receiving the user input selecting personal music station 226.

Figure 6:
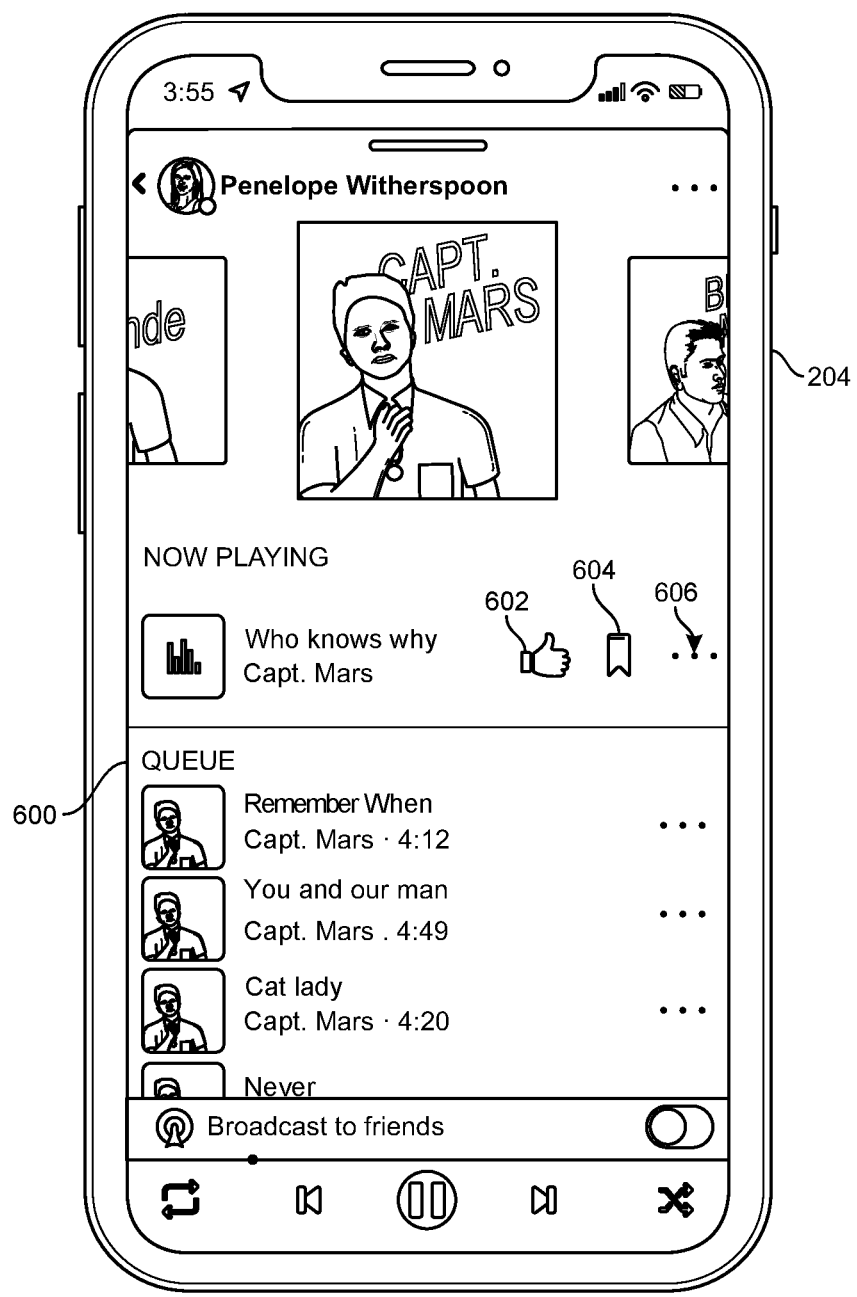
FIG. 6 is an illustration of an exemplary player interface corresponding to a personal music station included in the interface depicted in FIG. 5.

In some examples, music player module 230 may, in response to receiving the user input, display a personal station interface that (1) displays one or more music compositions from personal music station 226 and (2) provides a music player for playing the displayed music compositions. FIG. 6 provides a specific example of a personal station interface 600 that may be provided in response to receiving user input to personal music station 226 via music consumption interface 500 depicted in FIG. 5.

Figure 7:
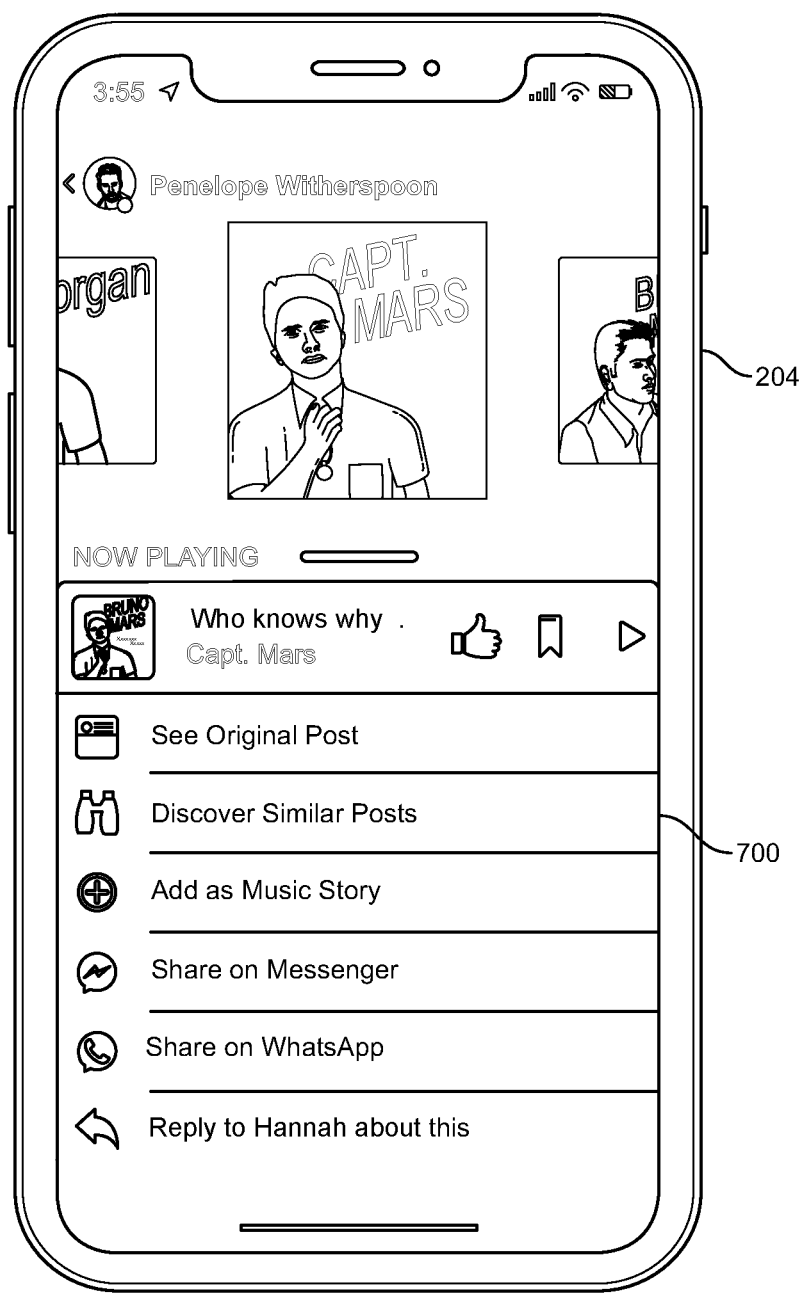
FIG. 7 is an illustration of an exemplary hover interface that includes one or more actions that may be performed in connection with a music composition being played from the personal music station depicted in FIG. 6.
Figure 8:
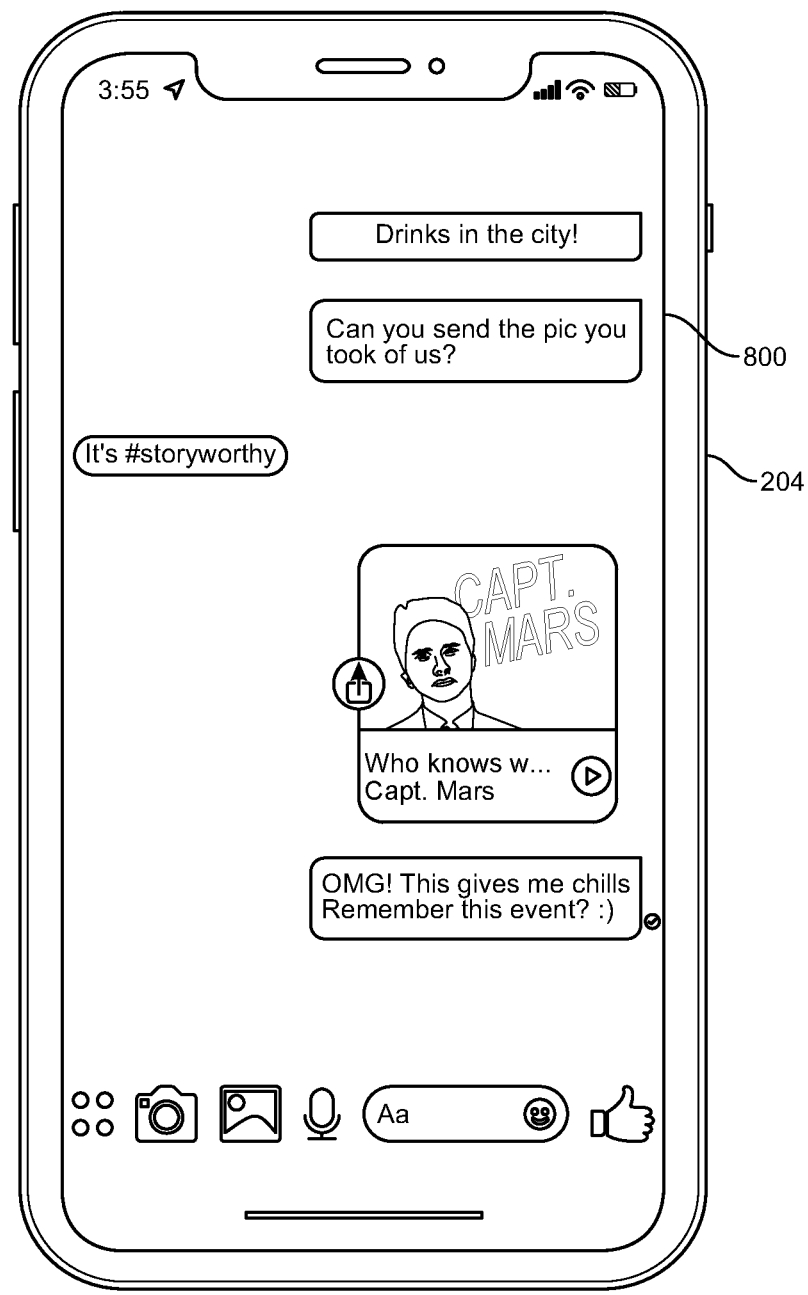
FIG. 8 is an illustration of an exemplary messaging interface corresponding to the player interface depicted in FIG. 6 and/or the hover interface depicted in FIG. 7.

In some examples, a personal station interface may provide a variety of digital means for socially connecting via personal music station 226. For example, as shown in FIG. 6, personal station interface 600 may include a "like" push button 602 for digitally liking a music composition being played, a "bookmark" push button for bookmarking a music composition being played, and/or a "more" push button 604 that may navigate to additional music-response options. As shown in FIG. 7, "more" push button 604 may navigate to an additional interface 700 with additional options (e.g., to add a music composition from personal music station 226 to a digital story composition, to digitally share a music composition from personal music station 226 in a private message, to send a digital message to the user to whom personal music station 226 is dedicated, etc.). FIG. 8 provides an exemplary messaging interface 800 of a digital message that may be initiated using a "message" push button illustrated in FIG. 7.

By creating and maintaining public-facing personal music stations as described above, the disclosed systems and methods may provide an interesting and searchable structure for organizing music. This may enable a form of music discovery that promotes digital social engagement through music.

The disclosed systems and methods may enable social engagement via music in a variety of additional ways, in addition to enabling social engagement by providing personal music stations. In one embodiment, station module 222 may create a poly-user station for multiple users who are contacts within social media platform 208 (e.g., user 210 and one or more additional users). In this embodiment, station module 222 may (1) identify an overlap in the users' music preferences and (2) add music compositions to the poly-user station that correspond to the identified overlap.

Station module 222 may identify the overlap in a variety of ways. For example, station module 222 may (1) identify a set of music compositions known or predicted to be of interest to user 210, (2) identify a set of music compositions known or predicted to be of interest to the additional users, and (3) identify an overlap in the set of music compositions.

In one such example, station module 222 may identify the overlap by (1) scanning a database of music compositions previously played by the music station for each of the users and (2) identifying one or more common music compositions that are included in each database. Additionally or alternatively, station module 222 may (1) deduce a user music preference of each user (e.g., based on user listening history as described above in connection with step 110) and (2) identify an overlap in the deduced user preferences.

In some examples, station module 222 may additionally create a most-popular playlist for user 210. In these examples, station module 222 may (1) identify one or more of user 210's contacts, (2) identify music compositions that are most popular with the contacts based on a popularity metric, and (3) add the music compositions identified as most-popular to the most-popular playlist. Station module 222 may rely on a variety of popularity metrics in determining which music compositions are most popular with user 210's contacts. For example, station module 222 may determine which music compositions have the highest number of listens by user 210's contacts, which music compositions have been listened to by more than a threshold number and/or ratio of user 210's contacts, and/or which music compositions have been listened to more than a threshold number of times by user 210's contacts.

In one embodiment, a digest module may create a periodic music digest to provide to user 210, which includes music-related information relating to a current time period. In this embodiment, the digest module may provide the periodic music digest via music service 206 (e.g., within a music-dedicated interface provided by social media application 212). The periodic music digest may include a variety of information. In some examples, the periodic music digest may include information collected via social media platform 208. For example, the periodic music digest may include a list of music compositions most popular with social media platform 208's user base, such as a list of most played songs of the week.

Additionally or alternatively, the periodic music digest may include a summary of digital social reactions to music compositions (e.g., social media comments associated with music compositions during the period). In some examples, the periodic music digest may include one or more new music compositions created and/or first listened to by members of the user base during the period and/or information relating to new music and/or current music events (e.g., information collected from third-party webpages).

In one embodiment, an awards module may automatically create music awards. For example, the awards module may (1) aggregate listening behavior of its user base and (2) create an award based on the aggregated listening behavior (e.g., an award for a music composition that was most listened to by the user base, most commented on, most digitally liked, most often shared via social media platform 208, etc.).

In some embodiments, the disclosed systems and methods may provide a message-sharing platform that includes a music sharing system that enables social music engagement within groups. In one example, the music sharing system (e.g., operating as part of music service 206) may enable users to start conversations relating to their music listening activities. For example, a player interface used to play music compositions may include a share-button (i.e., a selectable element) that may be used to share a music composition, a playlist, an album, a music station, and/or a collection of music compositions currently being listened to. The share button may be used to share the music compositions in a variety of digital locations (e.g., to a newsfeed composition, a personal music station, a digital story, and/or a private message).

In some examples, the music sharing system may enable shared music experiences within a messaging system. For example, the music sharing system may allow members of a group chat to digitally share music. In one example, the music sharing system may create a shared music station for members of a group chat. The music sharing system may create the shared music station automatically (e.g., in response to the creation of the group chat) or in response to receiving user input initiating the creation of the shared music station.

In some examples, the music sharing system may enable the members of the group chat to add music compositions to the shared music station. Additionally or alternatively, the music sharing system may automatically add music compositions to the shared music stations. In one such embodiment, the music sharing system may select music compositions that are automatically added based on (1) shared music preferences of the members of the group chat and/or (2) monitored listening behavior of one or more members of the group chat (e.g., music compositions listened to while a broadcast push button is selected). In some examples, the shared music station may automatically be created for each group chat that is created via the messaging system. In other examples, the shared music station may be created in response to affirmative user input initiating the same.

Figure 10:
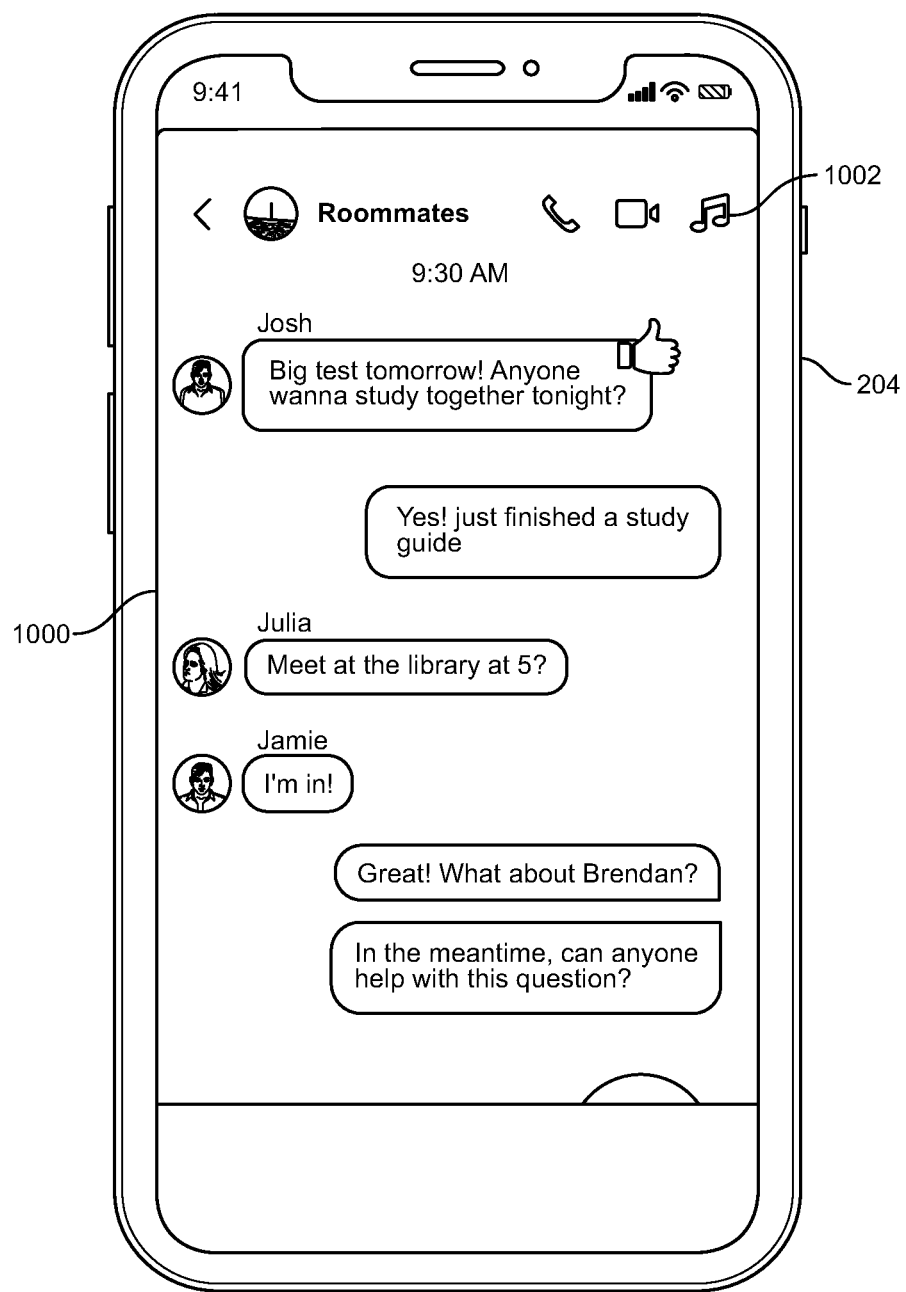
FIG. 10 is an illustration of a messaging interface corresponding to an exemplary group chat that operates in conjunction with a music service.
Figure 11A:
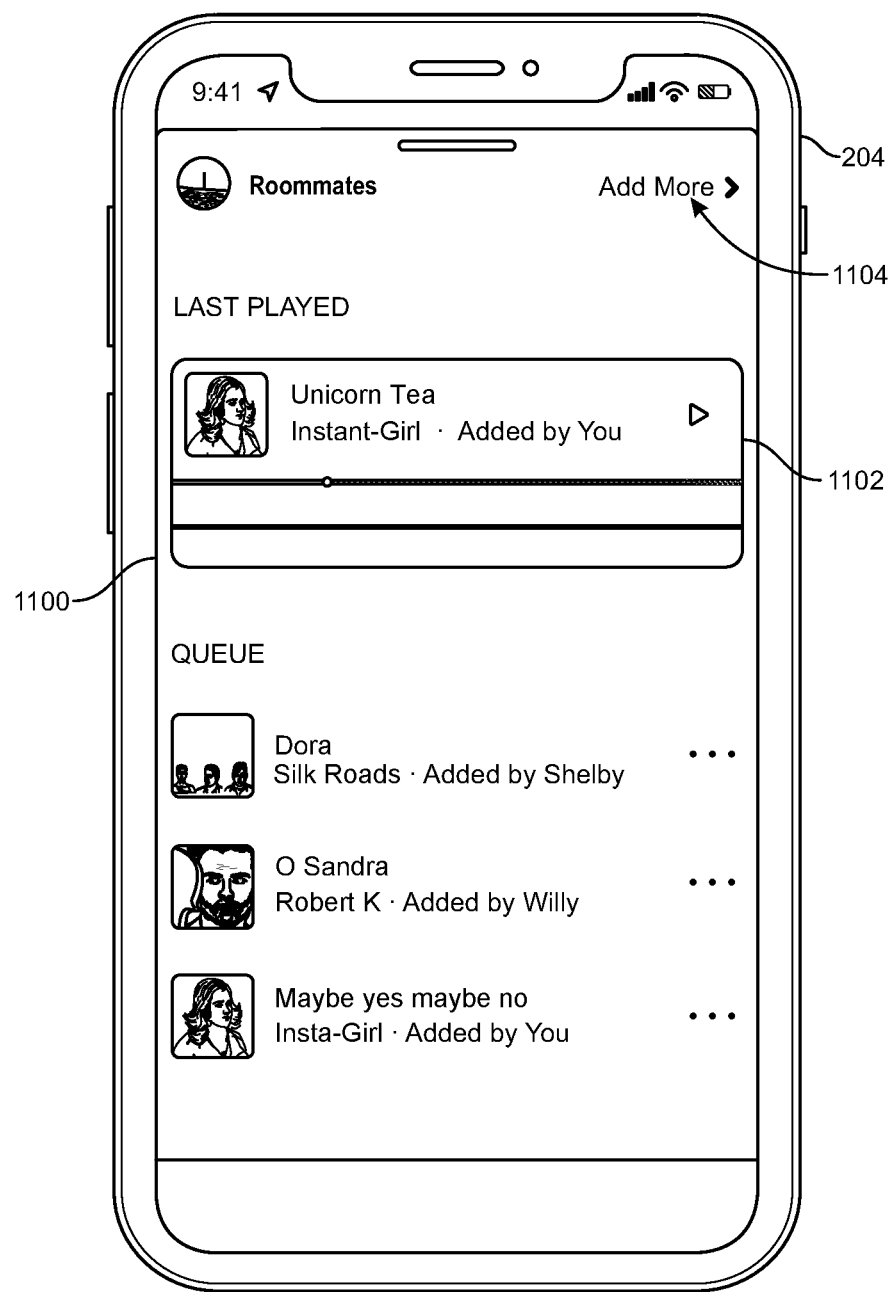
FIGS. 11A-11B are illustrations of interfaces associated with a shared music station that corresponds to the group chat depicted in FIG. 10.
Figure 11B:
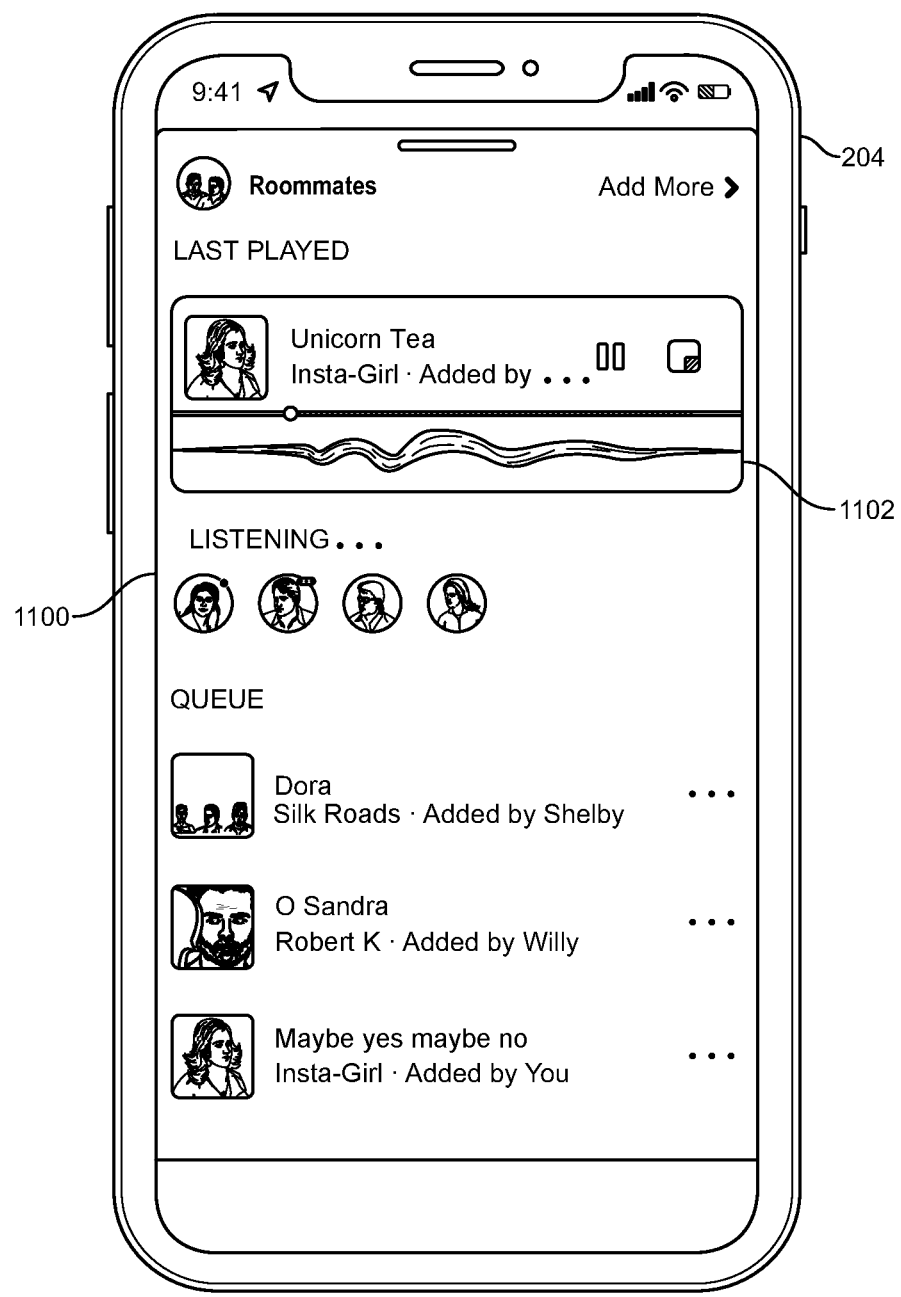
Figure 12:
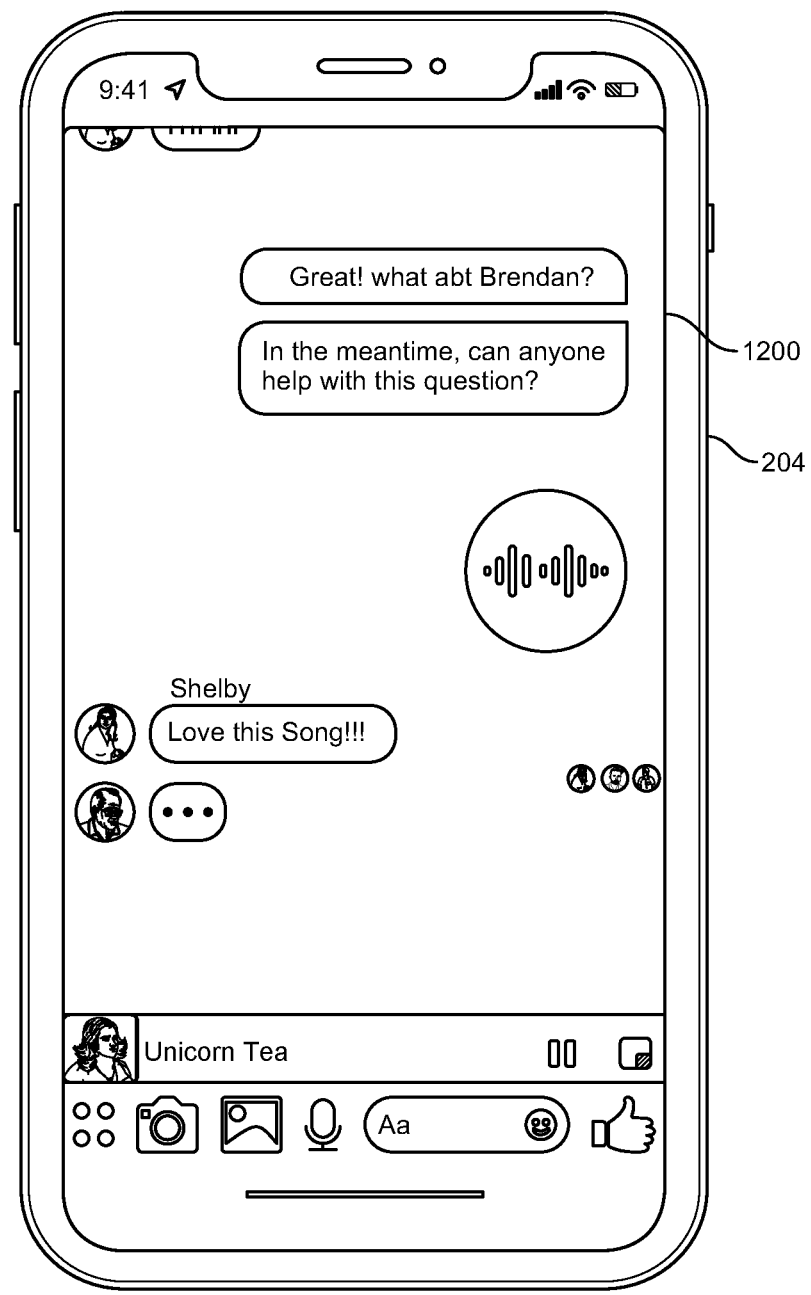
FIG. 12 is an illustration of an exemplary group chat message that coincides with the shared music station depicted in FIGS. 11A-11B.

FIGS. 10-12 provide a specific example of a group chat entitled "Roommates" that operates in connection with a music sharing system. In this example, a group chat interface 1000 may include a music station selectable element 1002. When selected, music station selectable element 1002 may navigate to a shared music station corresponding to the group chat (e.g., depicted within player interface 1100 in FIGS. 11A-11B).

Player interface 1100 may include a variety of information (e.g., a queue of music compositions, a music composition currently being played, and/or a list of members of the group chat that are currently listening). In one embodiment, player interface 1100 may be used to synchronously play music compositions (e.g., via a music player 1102 included within player interface 1100) to each member of the group chat that is currently accessing the shared music station. In another embodiment, player interface 1100 may be used to asynchronously play the music compositions (e.g., members of the group chat may select any song from the shared music station to play at any time). In some examples, the player interface may be used to add music to the shared music station (e.g., via an element 1104).

By creating a shared music station for members of a group chat, the disclosed music sharing system may facilitate members of a group chat to share music and discuss the shared music (e.g., using their group chat). FIG. 12 illustrates a digital messaging conversation 1200 that incorporates music from a group chat's shared music station.

As described throughout the present disclosure, the disclosed systems and methods may provide systems and methods for social media music streaming. In one example, a computer-implemented method may include (1) providing a music service within a social media platform, (2) presenting, via the music service, a music consumption interface that displays personal music stations, each of which is dedicated to music content associated with a different user of the social media platform, (3) receiving user input selecting one of the personal music stations, and (4) in response to receiving the user input, playing music content from the selected personal music station.

In one embodiment, the computer-implemented method may further include, prior to presenting the music consumption interface, creating each personal music station by (1) monitoring, via the music service, the listening behavior of a user to whom the personal music station is dedicated and (2) selecting music compositions for the personal music station that correspond to the monitored listening behavior.

In this embodiment, monitoring the listening behavior may include identifying one or more music compositions played for the user to whom the personal music station is dedicated and selecting the music compositions for the personal music station may include adding the identified music compositions to the personal music station. Additionally or alternatively, (1) monitoring the listening behavior may include (i) providing, to the user, an interface that includes a broadcast push button and displays information relating to a music composition currently being played via the music service, (ii) receiving user input selecting an on-state for the broadcast push button, and (2) selecting the music compositions for the personal music station may include selecting the music compositions based only on listening behavior monitored while the broadcast push button is in an on-state.

In some examples, providing the music service within the social media platform may include providing the music service as a passive layer within another service provided by the social media platform (e.g., a newsfeed, a digital stories service, and/or a messaging application). In one embodiment, the computer-implemented method may further include creating, for a user of the music service, a poly-user station dedicated to the user and at least one additional user by (1) identifying an overlap between a music preference of the user and a music preference of the additional user and (2) adding, to the poly-user station, one or more music compositions that correspond to the identified overlap.

In some examples, the computer-implemented method may further include creating a most-popular station for a user of the music service by (1) identifying one or more contacts of the user, (2) identifying music compositions that are most popular with the user's contacts based on a popularity metric, and (3) adding the music compositions identified as most-popular to the most-popular station. In some embodiments, the computer-implemented method may further include providing a user of the music service with a periodic music digest that may include music-related information relating to a current time period. In one embodiment, the computer-implemented method may further include automatically creating a music award based on aggregated listening behavior of users of the music service.

In one embodiment, a system for implementing the above-described method may include (1) a providing module, stored in memory, that provides a music service within a social media platform, (2) a presenting module, stored in memory, that presents, via the music service, a music consumption interface that displays personal music stations, each of which is dedicated to music content associated with a different user of the social media platform, (3) an input module, stored in memory, that receives user input selecting one of the personal music stations, (4) a music player module, stored in memory, that in response to the input module receiving the user input, plays music content from the selected personal music station, and (5) at least one physical processor configured to execute the providing module, the presenting module, the input module, and the music player module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide a music service within a social media platform, (2) present, via the music service, a music consumption interface that displays personal music stations, each of which is dedicated to music content associated with a different user of the social media platform, (3) receive user input selecting one of the personal music stations, and (4) play music content from the selected personal music station.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
providing a music service that operates as both an active layer of a social media platform and as a passive layer of a messenger service of the social media platform, wherein:
the music service operates as an active layer of the social media platform by providing a dedicated music interface that enables music consumption and music sharing; and
the music service operates as a passive layer of the messenger service by providing a shared music station accessible via a group chat interface of a group chat, within the messenger service, created for members of the group chat, wherein providing the shared music station comprises:
detecting the group chat; and
creating the shared music station for the group chat.

2. The computer-implemented method of claim 1, wherein creating the shared music station comprises automatically adding music compositions to the shared music station.

3. The computer-implemented method of claim 2, wherein:
automatically adding music compositions to the shared music station comprises:
monitoring, via the music service, for each member of the group chat, the listening behavior of the member while the member is listening to music via the music service of the social media platform; and
adding music compositions to the shared music station that correspond to the monitored listening behavior.

4. The computer-implemented method of claim 1, wherein creating the shared music station comprises at least one of:
automatically adding music compositions to the shared music station based on shared music preferences of the members of the group chat; or
enabling the members of the group chat to add music compositions to the shared music station.

5. The computer-implemented method of claim 1, wherein:
the group chat is accessible to the members of the group chat via a group chat interface hosted by the messenger service; and
the method further comprises:
generating a shared music station interface corresponding to the shared music station; and
providing, within the group chat interface, a music station selectable element configured to navigate to the shared music station interface when selected via user input.

6. The computer-implemented method of claim 5, wherein the shared music station interface comprises at least one of:
a queue of music compositions to be played via the shared music station; or
information corresponding to a music composition currently being played via the shared music station.

7. The computer-implemented method of claim 5, wherein the shared music station interface comprises a list of members of the group chat who are currently listening to the shared music station.

8. The computer-implemented method of claim 5, wherein the shared music station interface is configured to enable the members of the group chat to:
synchronously play music compositions, via a music player included within the shared music station interface, to each member of the group chat that is currently accessing the shared music station interface or
access the music compositions of the shared music station asynchronously.

9. The computer-implemented method of claim 5, further comprising:
determining that a music composition is being played via the shared music station; and
in response to determining that the music composition is being played, providing a graphic corresponding to the music composition within the group chat interface.

10. The computer-implemented method of claim 1, wherein creating the shared music station comprises automatically creating the shared music station in response to the creation of the group chat.

11. The computer-implemented method of claim 1, wherein:
the music service further operates as a passive layer of a digital story service that provides a user with a composition interface that enables the user to create a digital story composition; and
the music service operates as a passive layer of the digital story service by providing a selectable element, included within the composition interface provided by the digital story service, that enables the user to add music content to the digital story composition.

12. The computer-implemented method of claim 1, wherein:
the music service further operates as a passive layer of a digital newsfeed service that provides a user with a composition interface that enables the user to create a digital newsfeed composition; and
the music service operates as a passive layer of the digital newsfeed service by providing a selectable element, included within the composition interface provided by the digital newsfeed service, that enables the user to add music content to the digital newsfeed composition.

13. The computer-implemented method of claim 1, wherein both the music service and the messenger service of the social media platform are provided to a user via a social media application installed on a device of the user.

14. The computer-implemented method of claim 13, further comprising providing, within an interface of the social media application, a persistent entry point to the dedicated music interface, wherein the persistent entry point is permanently affixed to a designated position within the interface.

15. The computer-implemented method of claim 14, wherein:
the interface comprises a plurality of interfaces; and
each interface within the plurality of interfaces is dedicated to a different additional service provided via the social media application.

16. The computer-implemented method of claim 1, wherein the dedicated music interface comprises a music player.

17. The computer-implemented method of claim 1, further comprising:
minimizing the dedicated music interface; and
hovering the minimized dedicated music interface over an additional interface of the social media platform dedicated to a non-music service of the social media platform.

18. The computer-implemented method of claim 17, wherein the non-music service comprises at least one of:

a digital stories service;

a digital newsfeed service; or a digital messenger service.

19. A system comprising:

at least one physical processor;

physical memory comprising computer-executable instructions that, when executed by the physical processor, cause the physical processor to:

provide a music service that operates as both an active layer of a social media platform and as a passive layer of a messenger service of the social media platform, wherein:

the music service operates as an active layer of the social media platform by providing a dedicated music interface that enables music consumption and music sharing; and the music service operates as a passive layer of the messenger service by providing a shared music station accessible via a group chat interface within the messenger service of a group chat created for members of the group chat, wherein providing the shared music station comprises:

detecting the group chat; and creating the shared music station for the group chat.

20. A non-transitory computer-readable medium comprising one or more computer-readable instructions that, when executed by at least one processor of a computing device, cause the computing device to:

provide a music service that operates as both an active layer within a social media platform and as a passive layer of a messenger service within the social media platform, wherein:

the music service operates as an active layer of the social media platform by providing a dedicated music interface that enables music consumption and music sharing; and the music service operates as passive layer of the messenger service by providing a shared music station accessible via a group chat interface within the messenger service of a group chat created for members of the group chat, wherein providing the shared music station comprises:

detecting the group chat; and creating the shared music station for the group chat.

* * * * *